(12) United States Patent
Chen et al.

(10) Patent No.: US 12,055,419 B2
(45) Date of Patent: Aug. 6, 2024

(54) ELECTRONIC ROTARY ENCODER

(71) Applicant: HOYI ELECTRONIC TECHNOLOGY CO., LTD., Tainan (TW)

(72) Inventors: Chi-Yang Chen, Tainan (TW); Min-Fu Hsieh, Tainan (TW)

(73) Assignee: HOYI ELECTRONIC TECHNOLOGY CO., LTD., Tainan (TW)

( * ) Notice: Subject to any disclaimer, the term of this patent is extended or adjusted under 35 U.S.C. 154(b) by 469 days.

(21) Appl. No.: 17/511,623

(22) Filed: Oct. 27, 2021

(65) Prior Publication Data
US 2023/0024298 A1   Jan. 26, 2023

(30) Foreign Application Priority Data
Jul. 23, 2021 (TW) ................................ 110127190

(51) Int. Cl.
| | | |
|---|---|---|
| *H02K 11/215* | (2016.01) |
| *G01D 5/14* | (2006.01) |
| *H02K 11/26* | (2016.01) |
| *H02K 11/33* | (2016.01) |
| *H02K 29/08* | (2006.01) |
| *G01D 5/245* | (2006.01) |

(52) U.S. Cl.
CPC ........... *G01D 5/142* (2013.01); *H02K 11/215* (2016.01); *H02K 11/26* (2016.01); *H02K 11/33* (2016.01); *G01D 5/2451* (2013.01); *H02K 29/08* (2013.01)

(58) Field of Classification Search
CPC ....... H02K 11/215; H02K 11/33; H02K 29/08
See application file for complete search history.

(56) References Cited

U.S. PATENT DOCUMENTS

| | | | | |
|---|---|---|---|---|
| 4,963,808 | A * | 10/1990 | Torisawa ................. | H02P 8/14 318/653 |
| 8,638,053 | B2 * | 1/2014 | Ng ........................... | H02P 6/10 318/400.14 |
| 9,903,740 | B2 * | 2/2018 | Nishi ....................... | G06T 1/00 |
| 10,153,716 | B2 * | 12/2018 | Hardt ..................... | H02K 1/2791 |
| 2010/0195784 | A1 * | 8/2010 | Hirata ..................... | H02P 6/06 377/2 |
| 2018/0231401 | A1 * | 8/2018 | Okumura ............... | G01D 5/2451 |

FOREIGN PATENT DOCUMENTS

WO   WO-2015080299 A1 *  6/2015  ......... G01D 5/24476

\* cited by examiner

*Primary Examiner* — Gary A Nash
(74) *Attorney, Agent, or Firm* — Juan Carlos A. Marquez; Marquez IP Law Office, PLLC (57) ABSTRACT

An electronic rotary encoder is configured to be disposed on a vertical rotary shaft in a rotary object to obtain two encoded signals: a phase A signal and a phase B signal for calculating a rotational speed and a position. The electronic rotary encoder includes: at least one Hall element outputting Hall signals used as a square wave of the phase A signal; two capacitors, to respectively obtain a first voltage and a second voltage; two buffer gates, to respectively output waveform signals of a first X voltage and a second X voltage; two comparators outputting, a control signal through a latch; and an exclusive OR gate, where a direction signal and the control signal outputted through the latch are inputted to the exclusive OR gate, to obtain the phase B signal.

12 Claims, 6 Drawing Sheets

ELECTRONIC ROTARY ENCODER

CROSS-REFERENCE TO RELATED APPLICATION

This application claims the benefit of Taiwan Patent Application No. 110127190, filed on 23 Jul. 2021, which is hereby incorporated by reference for all purposes as if fully set forth herein.

BACKGROUND

Technical Field

The present disclosure relates to a rotary encoder, and specifically, to a circuit of an electronic rotary encoder.

RELATED ART

A rotary encoder is also referred to as a shaft encoder and is an electromechanical device capable of converting a rotation position or a rotation amount to an analog signal or a digital signal. The rotary encoder is usually mounted to a face of a vertical rotary shaft in a rotary object. The rotary encoder is used in a large number of occasions requiring precise rotation positions and speed, such as industrial control, robot technologies, special lens, computer input devices (such as mice and trackballs), and the like.

The rotary encoder may be classified into an absolute encoder and an incremental encoder. The incremental encoder is also referred to as a relative encoder and is configured to calculate a rotational speed and a position by means of pulse detection and output information about motion of a rotary shaft, and the information is generally converted to information such as a speed, a distance, a rotational speed per minute, or a position by other devices or circuits. The absolute encoder is configured to output the position of the rotary shaft, and may be regarded as an angle sensor.

The incremental encoder is different from the absolute encoder. When the rotary shaft rotates, the output of the incremental encoder is changed accordingly, and the rotation amount of the rotary shaft may be detected according to an output change. The absolute encoder numbers the rotation position of the rotary shaft, and the corresponding position of the rotary shaft can be obtained according to a signal outputted by the absolute encoder when the rotary shaft is still, but the incremental encoder does not have this function, causing an incapability of obtaining information about the rotation position of the rotary shaft when the rotary shaft is still.

The incremental encoder may be configured to sense information about the rotation amount of the rotary shaft to generate a phase A signal and a phase B signal, then generate information about a rotation direction, a rotation position, and a rotation angle by using a formula. The incremental encoder may be a linear encoder or a rotary encoder. Compared with the absolute encoder, the incremental encoder has low costs, and signals outputted by the incremental encoder are easily converted to information (such as a speed) about motion, so that the incremental encoder is the most widely used encoder.

The incremental encoder includes a mechanical encoder and an optical encoder. The mechanical encoder needs to process signal jitter and is generally used in a rotary knob on a consumer product. For example, most household and automobile radios use the incremental encoder as the rotary knob controlling volume. Generally, the mechanical encoder is only applicable to a scenario requiring a low rotational speed. The optical encoder is used in a scenario having a high speed or requiring high precision.

However, an existing incremental encoder is configured to detect a difference in a mechanical angle or an electrical angle in a 360-degree rotation angle of a motor. Although the incremental encoder has lower costs than the absolute encoder in use, relative costs cannot be reduced when a high resolution is required. In addition, it is relatively hard to integrate the incremental mechanical encoder and the incremental optical encoder with a control device.

SUMMARY

An objective of the present disclosure is to provide an electronic rotary encoder, and the electronic rotary encoder can be used to replace an existing incremental mechanical encoder and incremental optical encoder, has low costs, and is easy to achieve circuit integration.

Another objective of the present disclosure is to provide an electronic rotary encoder, where the electronic rotary encoder is applied to a rotary object or a multiphase motor having a requirement for a plurality of Hall elements, is easy to achieve circuit integration, provides encoded signals of a direction, an angle, and a speed, and is configured to be directly integrated with a driving system.

Yet another objective of the present disclosure is to provide an electronic rotary encoder, where the electronic rotary encoder is easily applied to a motor driving system without a sensor, and may directly detect a driving motor voltage UVW signal to obtain an encoded signal.

The present disclosure provides an electronic rotary encoder, configured to be installed in a vertical rotary shaft in a rotary object to obtain two encoded signals: a phase A signal and a phase B signal for calculating a rotational speed and a position, and the electronic rotary encoder comprising: a Hall element, disposed on a face of the vertical rotary shaft in the rotary object, a Hall signal outputted by the Hall element being used as a square wave of the phase A signal; two capacitors, wherein constant-current charging and discharging of the two capacitors are performed under control by a switch controlled by using the phase A signal, to respectively obtain triangular wave voltage waveforms of a first voltage and a second voltage relative to the square wave of the phase A signal; two buffer gates, wherein the first voltage and the second voltage are inputted to the two buffer gates under control by the switch controlled by using the phase A signal, to respectively output waveform signals of a first X voltage and a second X voltage being respectively X multiples of the first voltage and the second voltage, wherein 0<X<1; two comparators, wherein the first voltage and the first X voltage as well as the second voltage and the second X voltage are respectively inputted to the two comparators for comparisons, and after the comparisons, a control signal is outputted through a latch; and an exclusive OR gate, wherein a direction signal and the control signal outputted through the latch are inputted to the exclusive OR gate, to obtain the phase B signal.

The phase A signal is used for controlling two inverters connected in series and is then outputted to control switches of two constant-current sources to perform constant-current charging and discharging of the capacitors.

A pulse wave signal of the phase B signal is obtained according to a low level or a high level of the direction signal, and an outputted signal is encoded according to whether the phase B signal falls behind or precedes the phase A signal, so as to learn whether the rotary object rotates forward or reversely.

The Hall element is configured to detect a rotation angle of the rotary object within 360 degrees, a half cycle is a duration of 180-degree rotation, the first voltage and the second voltage are expressed as durations counted for 180 degrees, and values of the first voltage and the second voltage represent either angles or durations.

A plurality of sets of two capacitors is further added, and the square wave of the phase A signal is inputted to circuits of each set of the plurality of sets of two capacitors to be changed into different X values, so as to increase a resolution of encoding.

An electronic rotary encoder, configured to be disposed on a vertical rotary shaft in a rotary object to obtain two encoded signals: a phase A signal and a phase B signal for calculating a rotational speed and a position, the electronic rotary encoder comprising: at least two Hall elements, respectively disposed at different positions on a face of the vertical rotary shaft in the rotary object; an edge detection circuit, configured to receive Hall signals outputted by the Hall elements as a square wave of the phase A signal and export a direction signal; two capacitors, wherein constant-current charging and discharging of the two capacitors are performed under control by a switch controlled by using the phase A signal, to respectively obtain triangular wave voltage waveforms of a first voltage and a second voltage relative to the square wave of the phase A signal; two buffer gates, wherein the first voltage and the second voltage are inputted to the two buffer gates under control by the switch controlled by using the phase A signal, to respectively output waveform signals of a first X voltage and a second X voltage being respectively X multiples of the first voltage and the second voltage, wherein 0<X<1; two comparators, wherein the first voltage and the first X voltage as well as the second voltage and the second X voltage are respectively inputted to the two comparators for comparisons, and after the comparisons, a control signal is outputted through a latch; and an exclusive OR gate, wherein a direction signal and the control signal outputted through the latch are inputted to the exclusive OR gate, to obtain the phase B signal.

The phase A signal is used for controlling two inverters connected in series and is then outputted to control switches of two constant-current sources to perform constant-current charging and discharging of the capacitors.

The direction signal is a circuit clock connected, by using one of the Hall signals as a reference, by a D flip-flop triggered by a positive edge in the edge detection circuit, an other of the Hall signals is connected to a D input, and whether a low level or a high level of each clock is determined to indicate forward rotation or reverse rotation.

The phase A signal is a circuit clock output. The circuit clock output is obtained by pulse wave edge detections performed on the Hall signals outputted by the Hall elements by a corresponding quantity of multivibrators in the edge detection circuit, and is outputted to an OR gate to control a D flip-flop.

The Hall elements are configured to detect a rotation angle of the rotary object within 360 degrees, a half cycle is an angle rotation duration of 180 degrees divided by a quantity of the Hall elements, the first voltage and the second voltage are expressed as durations counted for an angle of the half cycle, and values of the first voltage and the second voltage represent either angles or durations.

A plurality of sets of two capacitors is further added, and the square wave of the phase A signal is inputted to circuits of each set of the plurality of sets of two capacitors to be changed into different X values, so as to increase a resolution of encoding.

When the rotary object is a rotary shaft of a motor, the edge detection circuit is configured to receive a driving output voltage of the motor to replace the Hall elements and Hall signals of the Hall elements, to obtain the phase A signal and the phase B signal.

The advantages of the present disclosure are as follows. The electronic rotary encoder is applicable to detection of the direction, angle, and speed of a rotary object such as a motor, and detected output signals may be used for imitating an existing common incremental encoder or may be directly integrated in an electronic circuit to reduce costs and facilitate integrated application. The electronic rotary encoder may be directly configured to detect a rotation angle of the motor within 360 degrees, so that there is no difference in mechanical angles or electrical angles. In application, a simple circuit is used as well as Hall elements and capacitors to replace the existing incremental encoder, so that costs are lower and circuit integration can be more easily achieved. In addition, a resolution may be increased by adding capacitors and detecting capacitor banks, and there is no problem of the resolution of the incremental encoder being limited by a pole pair of a motor and the electrical angle.

The electronic rotary encoder of the present disclosure is easily applied to a motor driving circuit system and includes a single Hall element input or a plurality of Hall element inputs, so as to detect and interpret a direction, an angle, and a speed, and an encoder output may be used by a post-stage circuit or an MCU. During application to a motor driving circuit system without a Hall sensor, the electronic rotary encoder can directly detect a driving voltage line, outputs an encoded signal, and is integrated with a driving circuit to provide the direction, the angle, and the speed for indication.

DETAILED DESCRIPTION

The following describes in detail the embodiments of the present disclosure with reference to the accompanying drawings. The accompanying drawings are simplified schematic diagrams, and are used for schematically illustrating the basic structure of the present disclosure. Therefore, only elements related to the present disclosure are marked in the accompanying drawings, and the elements shown are not drawn based on the number, shape, or size scale in practice. The specifications and sizes used in practical implementations are actually an optional design, and the layout and configuration of the elements may be more complex.

The following description of various embodiments is provided to exemplify the specific embodiments of the present disclosure with reference to the accompanying drawings. The directional terms mentioned in the present disclosure, for example, "upper", and "lower", are only references to the directions in the accompanying drawings. Therefore, the directional terms used are intended to describe and explain the present disclosure, but are not intended to limit the present disclosure. In addition, in this specification, unless otherwise particularly stated, the terms "include," "comprise" and any variants thereof are to be construed as including all the elements listed, but not excluding the presence of other elements.

A circuit of an electronic rotary encoder of the present disclosure is used to detect a system of a rotary object such as a motor and output electronic encoded signals: a phase A signal and a phase B signal for indication, so as to learn a direction, an angle, and a speed of the rotary object, thereby causing a circuit system to control the system of the rotary object such as the motor.

Figure 1:
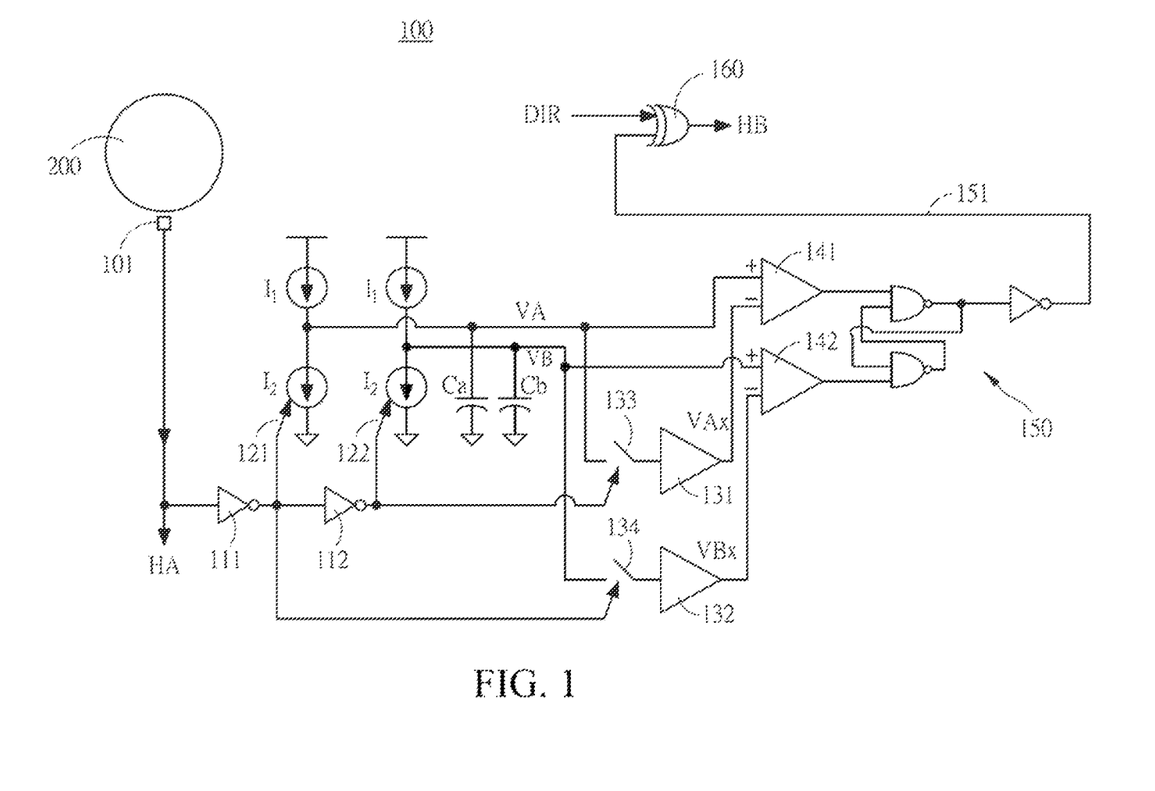
FIG. 1 is a schematic diagram of a circuit of an electronic rotary encoder according to the present disclosure.
Figure 2:
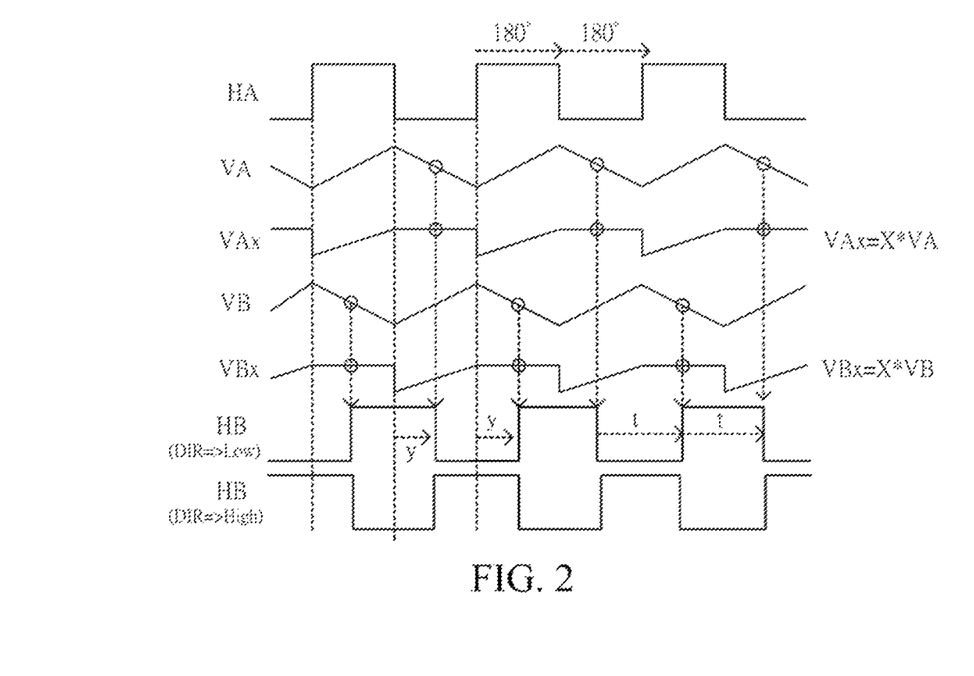
FIG. 2 is a schematic diagram of a pulse wave signal of the electronic rotary encoder in FIG. 1.

FIG. 1 is a schematic diagram of a circuit of an electronic rotary encoder according to the present disclosure, and FIG. 2 is a schematic diagram of a pulse wave signal of the electronic rotary encoder. An electronic rotary encoder 100 is configured to be disposed on a vertical rotary shaft in a rotary object 200 to obtain two encoded signals: a phase A signal HA and a phase B signal HB for calculating a rotational speed and a position. A single Hall element 101 is incapable of determining a direction, and the direction, an angle, and a speed may be indicated by using a direction signal DIR and the two outputted encoded signals: the phase A signal HA and the phase B signal HB. Details are described below.

The electronic rotary encoder 100 includes: a Hall element 101, disposed on a face of the vertical rotary shaft in the rotary object 200, a Hall signal outputted by the Hall element 101 being used as a square wave of the phase A signal HA; and two capacitors Ca and Cb, where constant-current charging and discharging of the two capacitors are performed under control by switches 121 and 122 controlled by using the phase A signal HA, to respectively obtain triangular wave voltage waveforms (shown in the schematic diagram of a pulse wave signal of FIG. 2) of a first voltage VA and a second voltage VB relative to the square wave of the phase A signal HA. In application, the phase A signal HA is used for controlling two inverters 111 and 112 connected in series and is then outputted to control switches 121 and 122 of two constant-current sources I1 and I2 to perform constant-current charging and discharging of the capacitors Ca and Cb. In common use, a constant current of the constant-current source I2 is 2 times a constant current of the constant-current source I1, that is, charging and discharging durations of the capacitors Ca and Cb remain the same.

The first voltage VA and the second voltage VB are inputted to two buffer gates 131 and 132 under control by switches 133 and 134 controlled by using the phase A signal, to respectively output waveform signals of a first X voltage VAx and a second X voltage VBx being respectively X multiples of the first voltage VA and the second voltage VB, where 0<X<1, VAx=X*VA, and VBx=X*VB. The first voltage VA and the first X voltage VAx as well as the second voltage VB and the second X voltage VBx are respectively inputted to two comparators 141 and 142 for comparisons, and after the comparisons, a control signal 151 is outputted through a latch 150 (in implementation, an inverter may be added on an output end, and an inverse signal is convenient for design and interpretation). The forgoing direction signal DIR and the control signal 151 outputted through the latch 150 are inputted to an exclusive OR gate 160, to obtain the phase B signal HB.

Outputted signals of the phase B signal HB and the phase A signal HA are finally obtained. Both the outputted signals are encoded signals and may be used for imitating a common incremental encoder. In application, the circuit of the present disclosure may be directly integrated into a post-stage electronic circuit, thereby reducing total costs and facilitating overall integrated application.

A single Hall element 101 is configured to detect a rotation angle of the rotary object 200 such as a motor within 360 degrees, and a half cycle t of the rotary object is a duration of 180-degree rotation. Therefore, voltage waveforms of the first voltage VA and the second voltage VB are expressed as durations counted for 180 angles, and values of the first voltage and the second voltage may represent either angles or durations. A pulse wave signal of the phase B signal HB is obtained from the control signal 151 outputted by using the comparators 141 and 142 to respectively compare the first voltage VA and the first X voltage VAx and the second voltage VB and the second X voltage VBx. According to a low level or a high level (indicating a direction) of the forgoing direction signal DIR and whether the phase B signal HB falls behind or precedes the phase A signal HA, an outputted signal is encoded, and forward rotation and reverse rotation are respectively expressed as 00→10→11→01 and 00→01→11→10. In general, X=0.5 indicates that the phase B signal falls behind or precedes the phase A signal by an angle of 90 degrees (X*180 degrees), a calculation formula is y=(1−X)*t, where 0<X<1. For example, X=⅓ indicates that the phase B signal falls behind or precedes the phase A signal by an angle of 60 degrees (X*180 degrees). Details are shown in FIG. 2.

Further, a plurality of sets of capacitors Ca and Cb is further added, and the square wave of the phase A signal HA is inputted to circuits of each set of the plurality of sets of capacitors Ca and Cb to be changed into different X values, so as to increase a resolution of encoding. For example, in addition to the phase B signal obtained when x=0.5, two sets of capacitor circuits are additionally increased, one set is X=0.75, an other set is X=0.25, that is, additionally increased signals HC and HD are outputted. The signals respectively represent an offset angle of 45 degrees and 135 degrees, so that the resolution is increased from 0(360), 90, 180, and 270 degrees of two outputted signals HA/HB to 0(360), 45, 90, 135, 180, 225, 270, and 315 degrees of four outputted signals HA/HB/HC/HD, and so on.

In implementation and application of the present disclosure, a plurality of Hall elements as well as an edge detection circuit may also be used for sensing, so as to automatically determine the direction of a motor and generate a corresponding encoded signal. In addition, the circuit of the present disclosure may be directly applied to a motor driving system without a sensor, and a voltage line of a driving motor is directly detected without using the Hall element, to obtain the direction and the encoded signal. An application mode of a plurality of Hall elements is similar to an application mode of a single Hall element. A difference is that an edge detection circuit (Edge Detect Circuit) may be added to more than two Hall elements to automatically detect and work out a direction signal DIR. Three Hall elements are used as an embodiment and described below.

Figure 3:
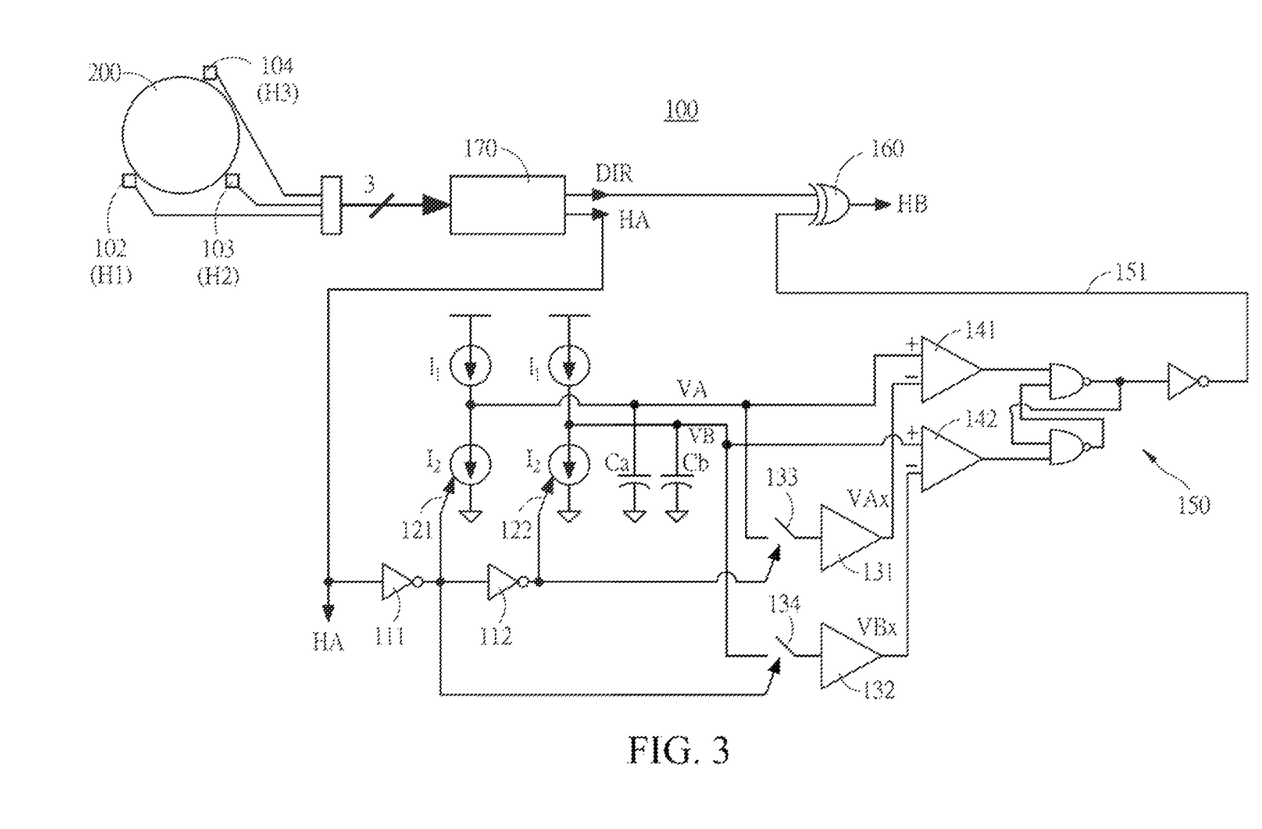
FIG. 3 is a schematic diagram of another circuit of the electronic rotary encoder according to the present disclosure.
Figure 4:
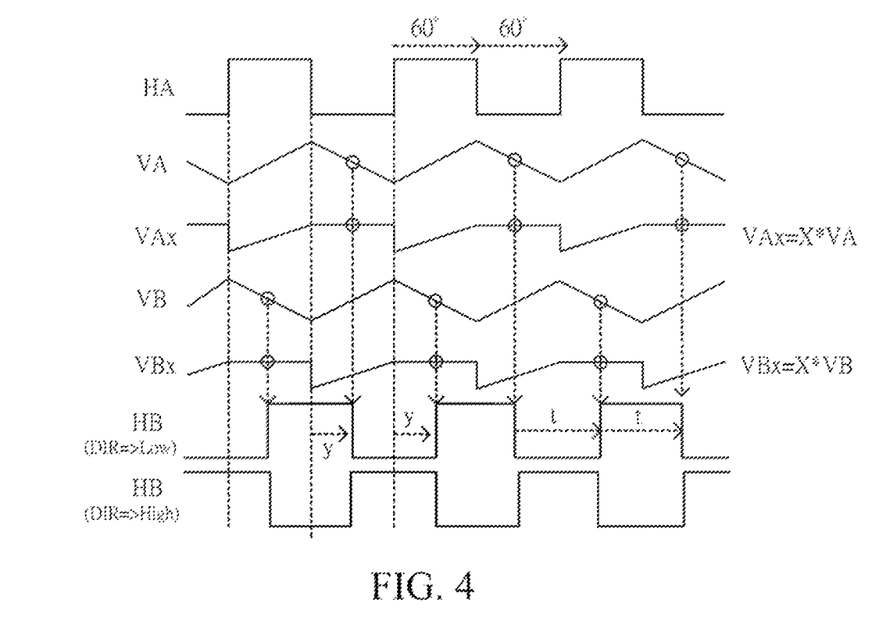
FIG. 4 is a schematic diagram of a pulse wave signal of the electronic rotary encoder in FIG. 3.

FIG. 3 is a schematic diagram of another circuit of an electronic rotary encoder according to the present disclosure, and FIG. 4 is a schematic diagram of a pulse wave signal of the circuit in FIG. 3. An electronic rotary encoder 100 is configured to be disposed on a vertical rotary shaft in a rotary object 200 to obtain two encoded signals: a phase A signal HA and a phase B signal HB for calculating a rotational speed and a position. Three Hall elements 102, 103, and 104 are respectively disposed at different positions on a face of the vertical rotary shaft in the rotary object 200. An edge detection circuit 170 is configured to receive Hall signals outputted by the Hall elements 102, 103, and 104 as a square wave of the phase A signal HA, and export a direction signal DIR. The schematic diagram of the pulse wave signal is similar to the application of a single Hall element, and a difference is that after the Hall elements 102, 103, and 104 are used, each half cycle of an HA pulse wave detected by the edge detection circuit 170 represents an angle of 60 degrees (180 degrees/3).

Referring to FIG. 5 again, the phase A signal is a circuit clock output. The circuit clock output is obtained, by means of pulse wave switching during edge switching, by pulse wave edge detections performed on the square wave of the Hall signals H1, H2, and H3 outputted by the three Hall elements 102, 103, and 104 by a corresponding quantity of multivibrators 171, 172, and 173 in the edge detection circuit 170, and is outputted to an OR gate 174 to control a D flip-flop 175.

Figure 5:
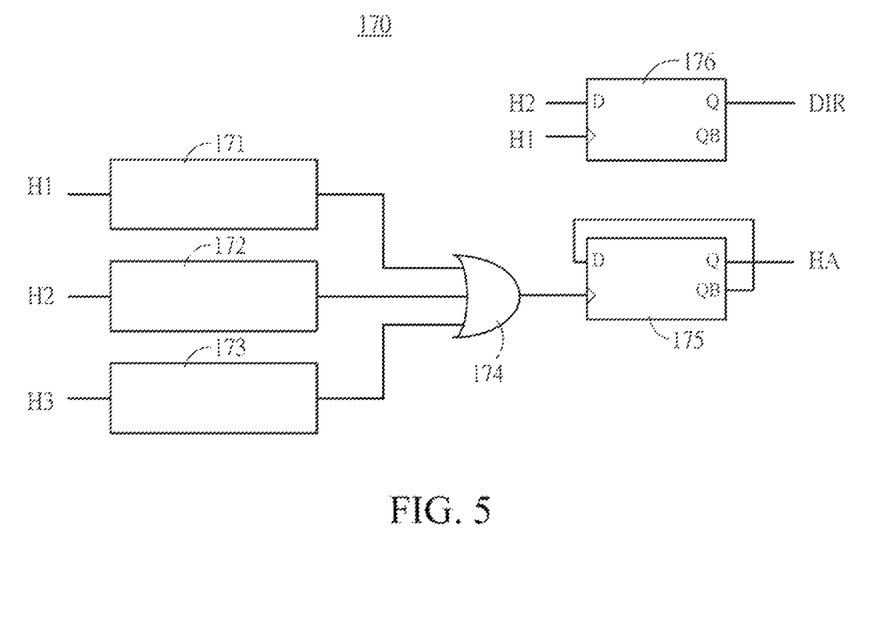
FIG. 5 is a schematic diagram of an edge detection circuit in FIG. 3.

The direction signal DIR is a circuit clock connected, by using one of the Hall signals as a reference (in the figure, the Hall signal H1 is used as the reference), to a D flip-flop 176 triggered by a positive edge in the edge detection circuit 170, and an other of the Hall signals (the Hall signal H2 in the figure) is connected to a D input of the D flip-flop 176, so that whether a low level or a high level of each clock is determined to indicate forward rotation or reverse rotation. For example, the direction signal is a circuit clock connected, by using the Hall signal H1 as the reference, to the D flip-flop 176 triggered by the positive edge, and the Hall signal H2 is connected to the D input, so that whether a low level or a high level of each clock is determined to indicate forward rotation or reverse rotation.

Constant-current charging and discharging of two capacitors Ca and Cb are performed under control by switches 121 and 122 controlled by using the phase A signal HA, to respectively obtain triangular wave voltage waveforms (shown in the schematic diagram of a pulse wave signal of FIG. 4) of a first voltage VA and a second voltage VB relative to the square wave of the phase A signal HA. In application, the phase A signal HA is used for controlling two inverters 111 and 112 connected in series and is then outputted to control switches 121 and 122 of two constant-current sources I1 and I2 to perform constant-current charging and discharging of the capacitors Ca and Cb.

The first voltage VA and the second voltage VB are inputted to two buffer gates 131 and 132 under control by switches 133 and 134 controlled by using the phase A signal, to respectively output waveform signals of a first X voltage VAx and a second X voltage VBx being respectively X multiples of the first voltage VA and the second voltage VB, where 0<X<1. The first voltage VA and the first X voltage VAx as well as the second voltage VB and the second X voltage VBx are respectively inputted to two comparators 141 and 142 for comparisons, and after the comparisons, a control signal 151 is outputted through a latch 150. The forgoing direction signal DIR and the control signal 151 outputted through the latch 150 are inputted to an exclusive OR gate 160, to obtain the phase B signal HB.

Outputted signals are finally obtained: the phase B signal HB and the phase A signal HA. Both the signals are encoded signals and may be used for imitating a common incremental encoder. In application, the circuit of the present disclosure may be directly integrated into an electronic circuit, so as to reduce costs and facilitate integrated application.

The Hall elements 102, 103, and 104 are configured to detect a rotation angle of the rotary object 200 within 360 degrees, and a half cycle is an angle rotation duration of 180 degrees divided by a quantity of Hall elements. Each half cycle of an HA pulse wave detected by the edge detection circuit 170 represents an angle of 60 degrees (180 degrees/3). Voltage waveforms of the first voltage VA and the second voltage VB are expressed as durations counted for angles of the half cycle, and values of the voltages may represent either angles or durations.

A pulse wave signal of the phase B signal HB is obtained from the control signal 151 outputted by using the comparators 141 and 142 to respectively compare the first voltage VA and the first X voltage VAx and the second voltage VB and the second X voltage VBx. According to a low level or a high level (indicating a direction) of the forgoing direction signal DIR and whether the phase B signal HB falls behind or precedes the phase A signal HA, an outputted signal is encoded, and forward rotation and reverse rotation are respectively expressed as 00→10→11→01 and 00→01→11→10.

Further, similar to the forgoing single Hall element, a plurality of sets of capacitors Ca and Cb is further added, and the square wave of the phase A signal HA is inputted to circuits of each set of the plurality of sets of capacitors Ca and Cb to be changed into different X values, so as to increase a resolution of encoding.

Figure 6:
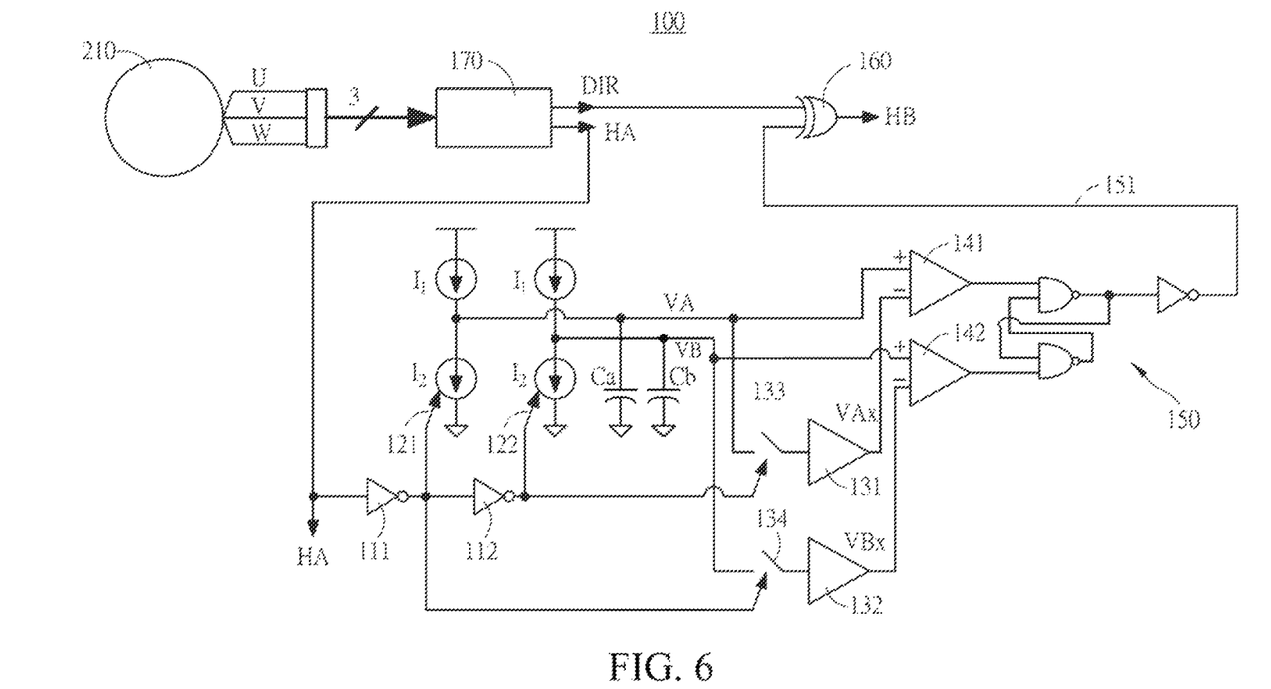
FIG. 6 is a schematic application diagram of another circuit of the electronic rotary encoder in FIG. 3.

Referring to FIG. 6, in implementation and application, when the rotary object 200 is a rotary shaft of a motor 210, the edge detection circuit is configured to receive a driving output voltage UVW signal of the motor 210, and the UVW signal may be used to replace the Hall elements 102, 103, and 104 and the Hall signals H1, H2, and H3 of the Hall elements. The remaining implementations are the same as the application of the forgoing plurality of Hall elements. The present disclosure is applied to a motor driving circuit system without a Hall sensor, so that the system can directly detect a driving voltage line, outputs an encoded signal, and is integrated with a driving circuit to provide the direction, the angle, and the speed for indication. The UVW signals may be repeated for a large number of times during the rotation of a mechanical shaft due to directly according to a quantity of magnetic poles of a connected motor, and may be used for a motor having four, six, or more poles.

The advantages of the present disclosure are as follows. The electronic rotary encoder is applicable to detection of the direction, angle, and speed of a rotary object such as a motor, and detected output signals may be used for imitating an existing common incremental encoder or may be directly integrated in an electronic circuit to reduce costs and facilitate integrated application. The electronic rotary encoder may be directly configured to detect a rotation angle of the motor within 360 degrees, so that there is no difference in mechanical angles or electrical angles. In application, a simple circuit is used as well as Hall elements and capacitors to replace the existing incremental encoder, so that costs are lower and circuit integration can be more easily achieved. In addition, a resolution may be increased by adding capacitors and detecting capacitor banks, and there is no problem of the resolution of the incremental encoder being limited by a pole pair of a motor and the electrical angle.

The electronic rotary encoder of the present disclosure is easily applied to a motor driving circuit system and includes a single Hall element input or a plurality of Hall element inputs, so as to detect and interpret a direction, an angle, and a speed, and an encoder output may be used by a post-stage circuit or an MCU. During application to a motor driving circuit system without a Hall sensor, the electronic rotary encoder can directly detect a driving voltage line, outputs an encoded signal, and is integrated with a driving circuit to provide the direction, the angle, and the speed for indication.

In application of the present disclosure, a single Hall element or a plurality of Hall elements (Hall ICs) may be used together, and the direction, the angle, and the speed may be learned by outputting an encoded signal. The electronic rotary encoder has the same effect as a common rotary encoder. In addition to having a simple application circuit and low costs, the electronic rotary encoder may directly detect 360-degree mechanical angles of rotation of a motor. Different from that the conventional rotary encoder detects an electrical angle, the electronic rotary encoder of the present disclosure may be limited by a quantity of poles inside a motor, and the resolution and costs of the used encoder may be influenced. According to the technology of the present disclosure, Hall elements may also be integrated to form a single chip, so as to replace the application field of a rotary encoder. In addition, encoded signals indicating a direction, an angle, and a speed may be obtained by directly detecting the driving output voltage of a motor without using the Hall elements. In this way, the electronic rotary encoder is directly applied to a motor driving system without a sensor or used together with a system capable of Hall signal detection.

The present disclosure being thus described, it will be obvious that the same may be varied in many ways. Such variations are not to be regarded as a departure from the spirit and scope of the present disclosure, and all such modifications as would be obvious to one skilled in the art are intended to be included within the scope of the following claims.

What is claimed is:

1. An electronic rotary encoder, configured to be disposed on a vertical rotary shaft in a rotary object to obtain two encoded signals: a phase A signal and a phase B signal for calculating a rotational speed and a position, the electronic rotary encoder comprising:
   a Hall element, disposed on a face of the vertical rotary shaft in the rotary object, a Hall signal outputted by the Hall element being used as a square wave of the phase A signal;
   two capacitors, wherein constant-current charging and discharging of the two capacitors are performed under control by a switch controlled by using the phase A signal, to respectively obtain triangular wave voltage waveforms of a first voltage and a second voltage relative to the square wave of the phase A signal;
   two buffer gates, wherein the first voltage and the second voltage are inputted to the two buffer gates under control by the switch controlled by using the phase A signal, to respectively output waveform signals of a first X voltage and a second X voltage being respectively X multiples of the first voltage and the second voltage, wherein 0<X<1;
   two comparators, wherein the first voltage and the first X voltage as well as the second voltage and the second X voltage are respectively inputted to the two comparators for comparisons, and after the comparisons, a control signal is outputted through a latch; and
   an exclusive OR gate, wherein a direction signal and the control signal outputted through the latch are inputted to the exclusive OR gate, to obtain the phase B signal.

2. The electronic rotary encoder according to claim 1, wherein the phase A signal is used for controlling two inverters connected in series and is then outputted to control switches of two constant-current sources to perform constant-current charging and discharging of the capacitors.

3. The electronic rotary encoder according to claim 1, wherein a pulse wave signal of the phase B signal is obtained according to a low level or a high level of the direction signal, and an outputted signal is encoded according to whether the phase B signal falls behind or precedes the phase A signal, so as to learn whether the rotary object rotates forward or reversely.

4. The electronic rotary encoder according to claim 1, wherein the Hall element is configured to detect a rotation angle of the rotary object within 360 degrees, a half cycle is a duration of 180 degree rotation, the first voltage and the second voltage are expressed as durations counted for 180 degrees, and values of the first voltage and the second voltage represent either angles or durations.

5. The electronic rotary encoder according to claim 1, wherein a plurality of sets of two capacitors is further added, and the square wave of the phase A signal is inputted to circuits of each set of the plurality of sets of two capacitors to be changed into different X values, so as to increase a resolution of encoding.

6. An electronic rotary encoder, configured to be disposed on a vertical rotary shaft in a rotary object to obtain two encoded signals: a phase A signal and a phase B signal for calculating a rotational speed and a position, the electronic rotary encoder comprising:
   at least two Hall elements, respectively disposed at different positions on a face of the vertical rotary shaft in the rotary object;
   an edge detection circuit, configured to receive Hall signals outputted by the Hall elements as a square wave of the phase A signal and export a direction signal;
   two capacitors, wherein constant-current charging and discharging of the two capacitors are performed under control by a switch controlled by using the phase A signal, to respectively obtain triangular wave voltage waveforms of a first voltage and a second voltage relative to the square wave of the phase A signal;
   two buffer gates, wherein the first voltage and the second voltage are inputted to the two buffer gates under control by the switch controlled by using the phase A signal, to respectively output waveform signals of a first X voltage and a second X voltage being respectively X multiples of the first voltage and the second voltage, wherein 0<X<1;
   two comparators, wherein the first voltage and the first X voltage as well as the second voltage and the second X voltage are respectively inputted to the two comparators for comparisons, and after the comparisons, a control signal is outputted through a latch; and
   an exclusive OR gate, wherein a direction signal and the control signal outputted through the latch are inputted to the exclusive OR gate, to obtain the phase B signal.

7. The electronic rotary encoder according to claim 6, wherein the phase A signal is used for controlling two inverters connected in series and is then outputted to control switches of two constant-current sources to perform constant-current charging and discharging of the capacitors.

8. The electronic rotary encoder according to claim 6, wherein the direction signal is a circuit clock connected, by using one of the Hall signals as a reference, to a D flip-flop triggered by a positive edge in the edge detection circuit, another of the Hall signals is connected to a D input, and whether a low level or a high level of each clock is determined to indicate forward rotation or reverse rotation.

9. The electronic rotary encoder according to claim 6, wherein the phase A signal is a circuit clock output, and the circuit clock output is obtained by pulse wave edge detections performed on the Hall signals outputted by the Hall elements by a corresponding quantity of multivibrators in the edge detection circuit, and is outputted to an OR gate to control a D flip-flop.

10. The electronic rotary encoder according to claim 6, wherein the Hall elements are configured to detect a rotation angle of the rotary object within 360 degrees, a half cycle is an angle rotation duration of 180 degrees divided by a quantity of the Hall elements, the first voltage and the second voltage are expressed as durations counted for an angle of the half cycle, and values of the first voltage and the second voltage represent either angles or durations.

11. The electronic rotary encoder according to claim 6, wherein a plurality of sets of two capacitors are further added, and the square wave of the phase A signal is inputted to circuits of each set of the plurality of sets of two capacitors to be changed into different X values, so as to increase a resolution of encoding.

12. The electronic rotary encoder according to claim 6, wherein when the rotary object is a rotary shaft of a motor, the edge detection circuit is configured to receive a driving output voltage of the motor to replace the Hall elements and Hall signals of the Hall elements.

* * * * *